United States Patent
Kahana (10) Patent No.: US 7,146,169 B2
(45) Date of Patent: Dec. 5, 2006

(54) POWER BALANCING FOR DOWNLINK FAST POWER CONTROL USING CENTRAL PROCESSING

(75) Inventor: Emanuel Kahana, Chicago, IL (US)

(73) Assignee: Motorola, Inc., Schaumburg, IL (US)

(*) Notice: Subject to any disclaimer, the term of this patent is extended or adjusted under 35 U.S.C. 154(b) by 265 days.

(21) Appl. No.: 10/802,290

(22) Filed: Mar. 17, 2004

(65) Prior Publication Data

US 2005/0208946 A1   Sep. 22, 2005

(51) Int. Cl.
*H04Q 7/20* (2006.01)
(52) U.S. Cl. .................... 455/442; 455/436; 455/437; 455/438; 455/443; 455/444; 455/522; 370/318; 370/331
(58) Field of Classification Search ........ 455/436–439, 455/442, 443, 444, 450–452.1, 522; 370/318, 370/335, 320, 331–334
See application file for complete search history.

(56) References Cited

U.S. PATENT DOCUMENTS

| | | | |
|---|---|---|---|
| 5,495,484 A * | 2/1996 | Self et al. ................. 370/338 |
| 5,574,982 A * | 11/1996 | Almgren et al. ............ 455/69 |
| 5,936,754 A | 8/1999 | Ariyavisitakul et al. |
| 6,016,426 A | 1/2000 | Bodell |
| 6,085,108 A * | 7/2000 | Knutsson et al. ........... 455/522 |
| 6,128,493 A * | 10/2000 | Song ........................ 455/436 |
| 6,144,861 A * | 11/2000 | Sundelin et al. ........... 455/522 |
| 6,233,461 B1 * | 5/2001 | Chinitz et al. ............. 455/522 |
| 6,324,391 B1 | 11/2001 | Bodell |
| 6,708,041 B1 * | 3/2004 | Butovitsch et al. ........ 455/522 |
| 6,823,193 B1 * | 11/2004 | Persson et al. ............. 455/522 |
| 6,937,583 B1 * | 8/2005 | Czaja et al. ............... 370/331 |
| 6,937,878 B1 * | 8/2005 | Kim et al. ................. 455/561 |
| 2002/0067708 A1 * | 6/2002 | Aoki ........................ 370/335 |

OTHER PUBLICATIONS

Holma and Toskala, WCDMA for EMTS, Wiley, 2000, p. 194.*
Holma & Toskala, "WCDMA for UMTS", Wiley 2000, p. 194.
Kahana, M. et al.: "Central Processing/Remote RF" for Cellular Networks, using Optical Microcells: Concept and Performance, SDR '02, 2002 Software Defined Radio Technical Conference and Product Exposition Nov. 11, 12, 2002-San Diego, California.

* cited by examiner

*Primary Examiner*—Steve M. D'Agosta (57) ABSTRACT

A method of performing a soft handoff in a third generation (3G) cellular system comprising the steps of receiving a request for a change in power from a communications device at a plurality of base stations; sending the request from at least one of the base stations to a central processing station; determining at the central processing station a power adjustment ratio for each of the plurality of base stations; and sending one or more control signals from the central processing station to each of the plurality of base stations to adjust the power output of at least one of the plurality of base stations. A communication system for controlling power during a soft handoff in 3G cellular systems comprising a plurality of base stations configured to send and receive signals to a plurality of communication devices; and a central command station configured to send and receive signals to the plurality of base stations, the central command station further configured to communicate power control commands to the plurality of base stations; wherein the power control commands control the output power of at least two base stations in response to one of the communication devices sending a power adjust request.

14 Claims, 10 Drawing Sheets

POWER BALANCING FOR DOWNLINK FAST POWER CONTROL USING CENTRAL PROCESSING

FIELD OF THE INVENTION

The present invention relates generally to communication systems. More specifically, the present invention relates to communication systems utilizing central processing.

BACKGROUND

Wireless communication systems are widely used for many different purposes. More and more people every day purchase cellular telephones or other wireless communication devices, including but not limited to pagers, computers, and Personal Digital Assistants (PDA's). These devices can be capable of receiving and transmitting information using a communication system such as a cellular network.

One place people use their communication devices is when traveling (for example, when driving in a car, riding a bus, or riding in a taxi). In operation, the communication device typically receives a signal from a first cell of the cellular system. Next, the communication device will receive signals from the first cell and additionally a second cell as the communication device moves toward the second cell and away from the first cell. Finally, as the communication device continues to move away from the first cell and toward the second cell the communication device will only receive a signal from the second cell. This scenario is what is known in Code Division Multiple Access (CDMA) systems as a soft handoff or handover (that is, a smooth, planned, and transparent switch from one cell to another). Though such soft handoffs are desirable, it is estimated that a soft handoff occurs only 40% of the time when a communication device is being used inside a moving vehicle.

In normal conditions, when moving from a first cell toward a second cell, the signal from the first cell becomes weaker, while the signal from the second cell becomes stronger. When the signal from the second cell is stronger than a threshold $T_{add}$, the communication device starts communicating with the base station in the second cell while also communicating with the base station in the first cell. The communication device will communicate with both cells until the signal from the first cell drops bellow a threshold $T_{drop}$. During this transition period, the mobile is vulnerable, and adverse RF conditions may cause, for example, the call to drop.

Figure 1:
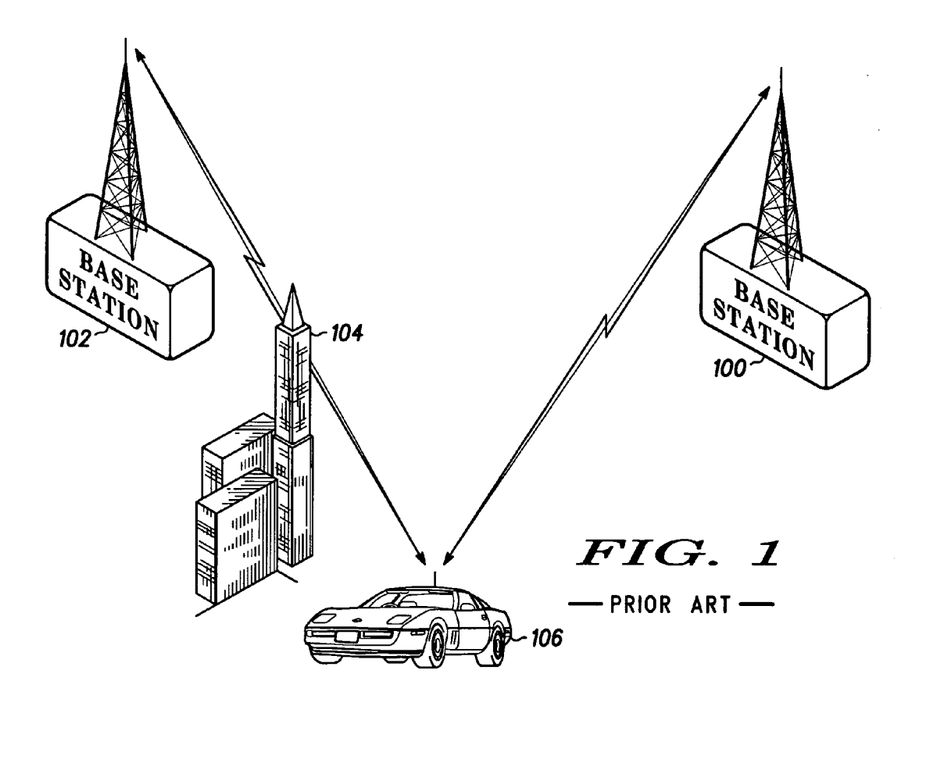
FIG. 1 is a diagram illustrating the reception of signals from more than one base station.

A problem can occur when the mobile moves from a first cell to a second cell for the scenario shown in FIG. 1 (further description regarding FIG. 1 is provided below). In this scenario, the signal from the second cell is partially blocked by a building. As a car carrying a wireless mobile station travels toward the second cell, the signal from the second cell will increase enough to exceed the $T_{add}$ threshold causing the mobile to enter a soft handoff. Nevertheless, while the signal from the first cell becomes weaker, the signal from the second cell remains low, due to a large building that blocks the signal from the second cell. In this situation the mobile's signal to interference (S/I) experience will decrease and a request for more power from the base stations will be made by the communication device via a fast forward power control loop as is well understood in the art. Since both base stations within these cells will receive the same command, they will both increase their power by the same ratio, and, since the signal from the first cell was a-priori stronger, power drift will typically take place. Nevertheless, the increase in power will not be very helpful, since the communication device is moving away from the first cell and is still in the shadow of the building for the signal from the second cell. As a result, the communication device will send another request for power increase, causing further power drift. This can continue to happen as long as the communication device is in the shadow of the building. As a result, two things may happen. First, unless the communication device moves from the shadow of the building, the handoff may fail and the call may drop. Second, the increase in the power of the first cell, while not very helpful for the mobile, may cause interference to other cells. Both of these possibilities are undesirable.

BRIEF DESCRIPTION OF THE DRAWINGS

The features and advantages of the present invention will be apparent from the following description thereof, presented in conjunction with the following drawings wherein.

Corresponding reference characters indicate corresponding components throughout the several views of the drawings. Skilled artisans will appreciate that elements in the figures are illustrated for simplicity and clarity and have not necessarily been drawn to scale. For example, the dimensions, sizing, and/or relative placement of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of the invention. The scope of the invention should be determined with reference to the claims.

One embodiment can be characterized as a method of performing a soft handoff comprising the steps of receiving a request for a change in power from a communication device at a plurality of base stations; sending the request from at least one of the base stations to a central processing station; determining at the central processing station a power adjustment ratio for each of the plurality of base stations; and sending one or more control signals from the central processing station to each of the plurality of base stations to adjust the power output of at least one of the plurality of base stations. Optionally, the central command station utilizes an algorithm to determine an adjustment of power at the at least two base stations. The algorithm can be defined by: $p1a=p2a=(p1b+p2b)/2$; wherein $p1b$ and $p2b$ are the power levels before a handoff transition; wherein $p1a$ and $p2a$ are the power levels after a handoff transition.

Another embodiment provides a communication system for controlling power during a soft handoff comprising a plurality of base stations configured to send and receive signals to a plurality of communication devices; and a central command station configured to send and receive signals to the plurality of base stations, the central command station further configured to communicate power control commands to the plurality of base stations; wherein the power control commands control the output power of at least two base stations in response to one of the communication devices sending a power adjust request.

Yet another embodiment includes a central command station comprising a first communication channel for sending and receiving data from a first base station; a second communication channel for sending and receiving data from a second base station; and one or more processing units for determining power control signals for controlling the output power of the first base station and the second base station, wherein the power control signal is determined in response to a request from a communication device, the request received by both the first base station and the second base station.

An alternative embodiment includes a system for performing a soft handoff comprising means for receiving a request for a change in power from a communication device at a plurality of base stations; means for sending the request from at least one of the base stations to a central processing station; means for determining at the central processing station a power adjustment ratio for each of the plurality of base stations; and means for sending one or more control signals from the central processing station to each of the plurality of base stations to adjust the power output of at least one of the plurality of base stations.

These various embodiments tend to permit the avoidance of dropped calls and/or increased interference as otherwise tends to characterize prior practices in this regard. Notwithstanding such improved performance, only relatively modest alterations to the standard functioning of various system elements needs to be effected. These various embodiments can be implemented on a third generation (3G) cellular system, such as, CDMA2000 and WCDMA, however other systems can also be utilized.

Referring to FIG. 1, a diagram is shown illustrating the reception of signals from more than one base station in accordance with various embodiments. Shown is a first base station 100, a second base station 102, a vehicle 106, and a building 104 (these various elements are each well understood in the art and additional description of these elements will not be provided here except where especially appropriate or helpful to the reader).

In various third generation (3G) standards including both CDMA2000 and WCDMA fast power control is used on the downlink. Unlike on the uplink, where the purpose of power control is to solve the "near-far" problem, the purpose of power control on the downlink is to provide additional power to mobiles or communication devices at the cell edge as they suffer from increased other-cell interference. The near-far problem is a basic problem known to a person of ordinary skill in the art. In CDMA systems because many users transmit data on the same frequency, the higher received power from users nearby constitute an interference that degrades the general performance of the system. In order to combat this near-far phenomenon, power control is utilized to make sure that the powers received at the base station are the same for all users. A communication device, based on the signal strength received, commands the downlink power control. The command can be an up or down increment, and is sent to the base station e.g., at 800 Hz in CDMA2000 and at 1500 Hz in WCDMA.

In current systems that do not incorporate a central power control command system, problems often arise when the mobile is in soft handoff. This appears to happen on average about 40% of the time in a vehicular scenario. In this situation, the power control command is identical for both base stations irrespective of their individual power level. As described above, since these power levels are usually different, a power command for an increase increment will typically cause further power drifting between the base stations. This can increase interference and may degrade soft handoff performance. This is further described at page 194 of "WCDMA for UMTS" by Holma & Toskala, Wiley 2000, which is incorporated herein in its entirety.

One way to reduce power drifting is to limit the dynamic range of the power output. Another solution is for the base stations to send the power information to the Radio Network Controller (RNC), which can change the reference value and make power corrections toward it. One problem with this method is that the connection between the base station at the cell site and the RNC in the central office is slow, and the delay caused by this method may not solve the problem.

Figure 2:
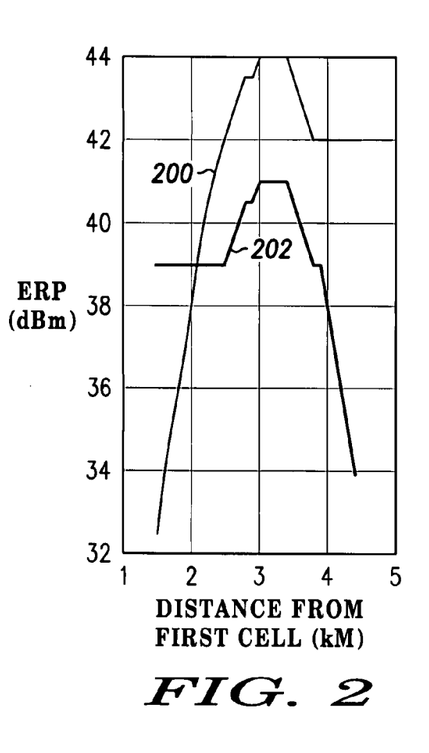
FIG. 2 is a diagram illustrating the effective radiated power verses the distance from a cell in accordance with one embodiment.
Figure 3:
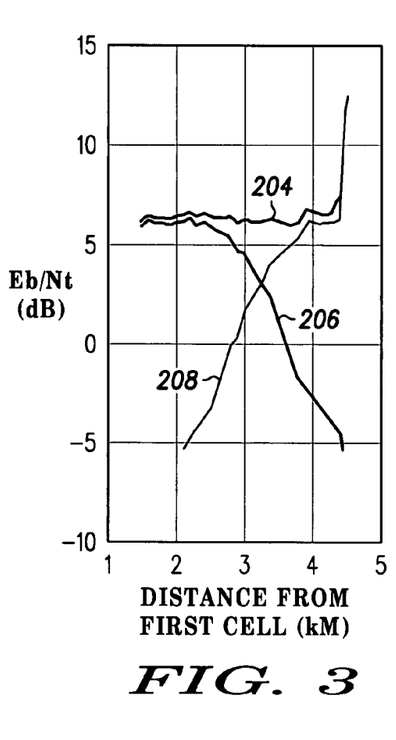
FIG. 3 is a diagram illustrating received signal strengths of a mobile electronic device during a soft handoff in accordance with one embodiment.
Figure 4:
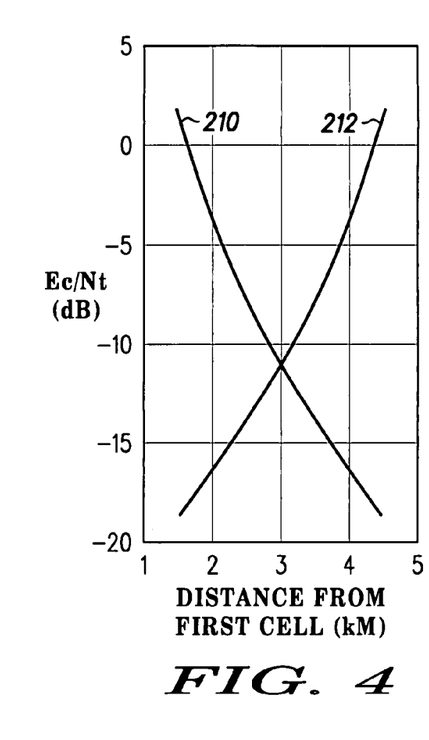
FIG. 4 is a diagram illustrating carrier energy verses total noise density in accordance with one embodiment.

Referring to FIGS. 2–4 diagrams are shown illustrating power levels during a soft handoff in accordance with one embodiment. Shown are results for the scenario described with reference FIG. 1 for which both of the cells receives the request from the communication device for an increase in power and both cells increase their power in response thereto. Shown is an effective radiated power (ERP) for a first cell 200, an ERP for a second cell 202, a bit energy over total noise density (Eb/Nt) for the first cell 204, a Eb/Nt for the second cell 206, a combined Eb/Nt 208, a carrier energy over total noise density (Ec/Nt) for the first cell 210, and a Ec/Nt for the second cell 212.

Figure 5:
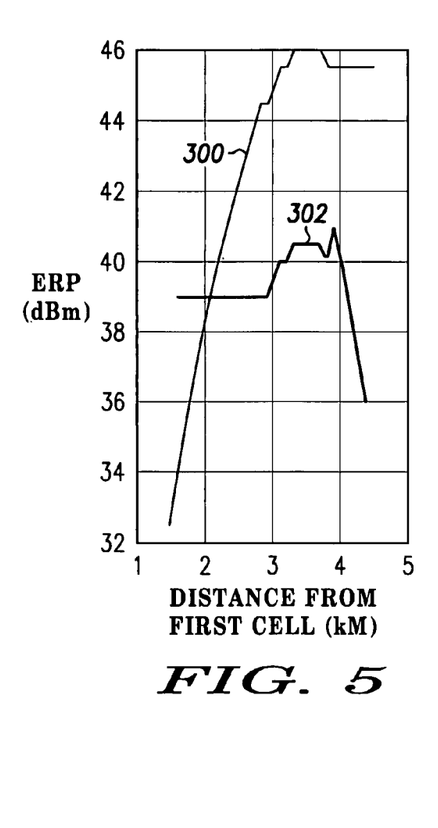
FIG. 5 is a diagram illustrating the effective radiated power verses the distance from a cell in accordance with a second embodiment.
Figure 6:
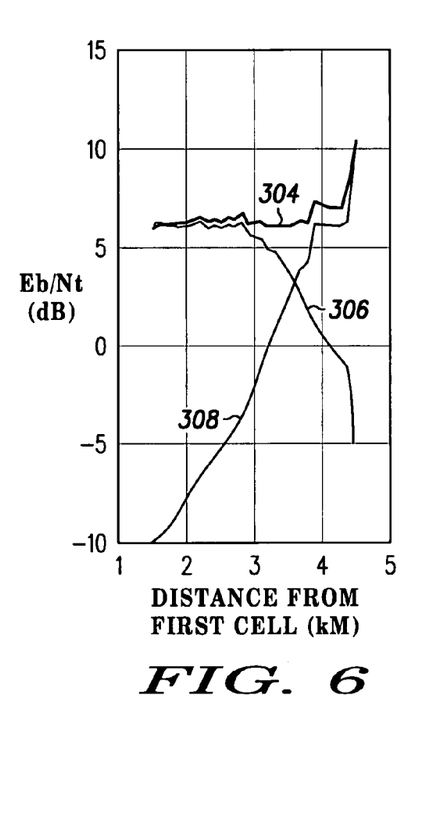
FIG. 6 is a diagram illustrating received signal strengths of a mobile electronic device during a soft handoff in accordance with the second embodiment.
Figure 7:
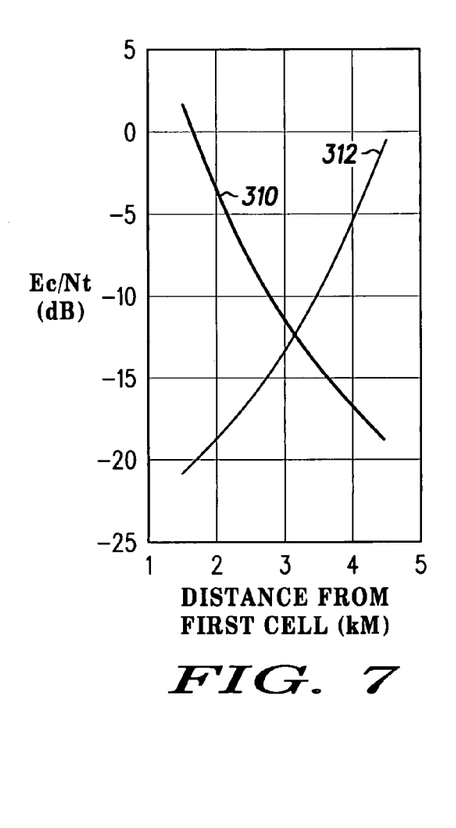
FIG. 7 is a diagram illustrating carrier energy verses total noise density in accordance with the second embodiment.

The results of FIGS. 2–4 assume that the same propagation loss from both cells will occur. FIGS. 5–7 show a similar situation with the addition of a 5 db propagation loss imbalance between the two cells. In both FIGS. 2–4 and FIGS. 5–7 the Eb/Nt (bit energy over total noise density) at the communication device is maintained constant throughout the communication device's movement, and the power difference between the two cells maintains a gap and drifts during the handoff period. This effect is even more accentuated, as shown in FIGS. 5–7, when there is an imbalance in the propagation loss. Shown in FIGS. 5–7 is effective radiated power (ERP) for a first cell 300, an ERP for a second cell 302, a bit energy over total noise density (Eb/Nt) for the first cell 304, a Eb/Nt for the second cell 306, a combined Eb/Nt 308, a carrier energy over total noise density (Ec/Nt) for the first cell 310, and a Ec/Nt for the second cell 312.

As described above in the background, power drifting is one problem associated with a soft handoff. To avoid this problem, a method can be implemented where the powers of the base stations are reset to the nominal value as soon as the handoff is performed, and again when the mobile exits the handoff. This solution solves the problem of power drifting while creating, however, another problem. The problem created using this method is that it instantaneously reduces the power received by the mobile followed by power increase commands from the mobile.

Figure 8:
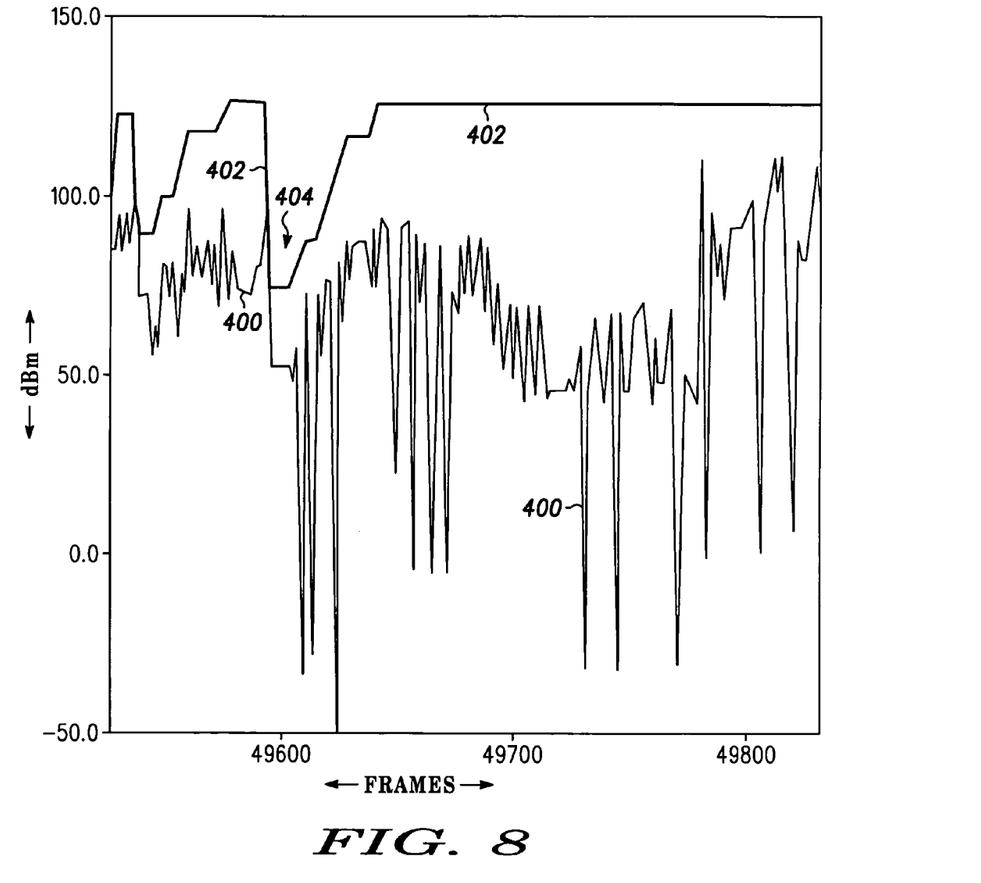
FIG. 8 is a diagram illustrating received signal strengths of a mobile electronic device during a soft handoff utilizing a power reset function in accordance with an embodiment.

Referring to FIG. 8, a graph is shown depicting the power received at a communication device illustrating the instantaneous power reduction associated with resetting the power from the cells to a nominal value. Shown is a signal 400, a power level 402 and a notch 404 at the handoff. The graph in FIG. 8 shows the power and received signal records. As soon as the mobile enter the handoff, there is a drop in power from the base station and a drop in the received signal, followed by a stepped increase in power from the base station. Therefore, there is a power notch, which causes a drop in the signal received by the communication device, e.g., a mobile phone. The mobile then starts commanding a power increase which takes time for the results to be seen. In the example shown, it takes about 30 frames (0.6 sec.) to recover the signal during which time the call can drop.

Figure 9:
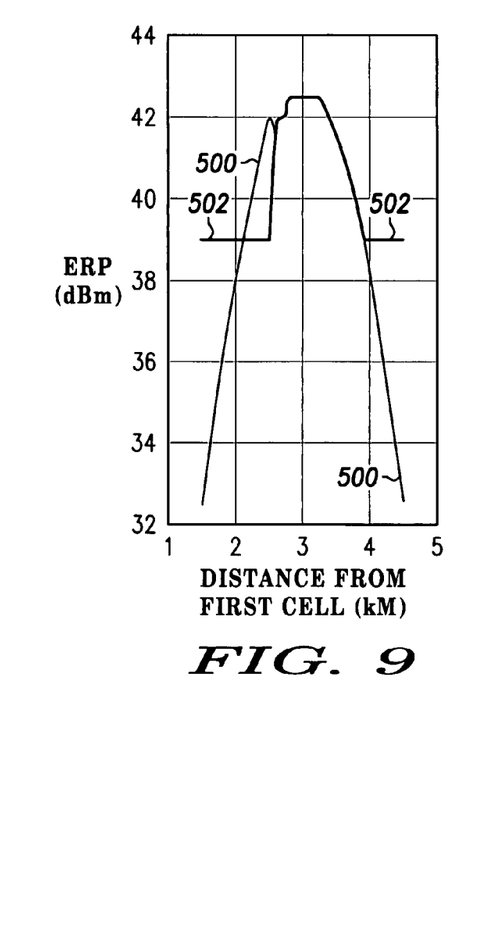
FIG. 9 is a diagram illustrating the effective radiated power verses the distance from a cell in accordance with one embodiment.
Figure 10:
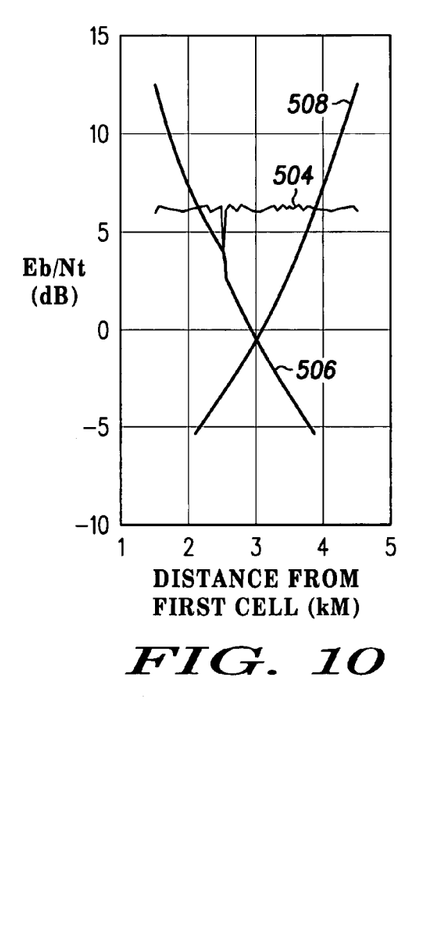
FIG. 10 is a diagram illustrating received signal strengths of a mobile electronic device during a soft handoff in accordance with one embodiment.
Figure 11:
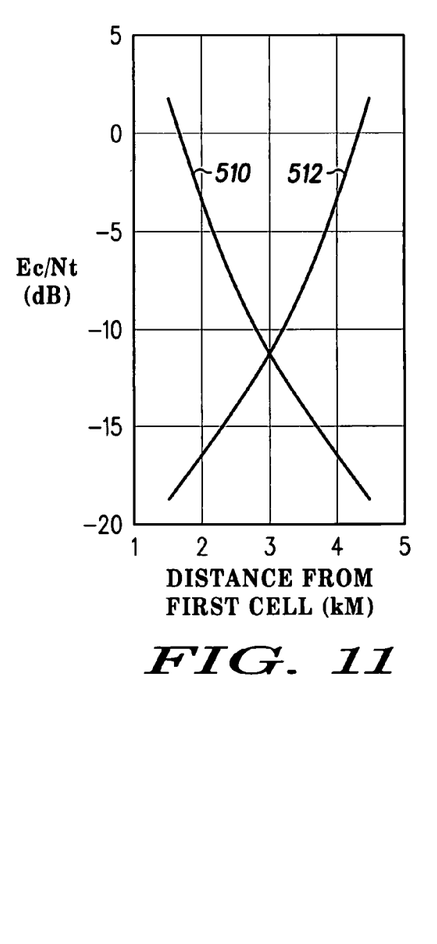
FIG. 11 is a diagram illustrating carrier energy verses total noise density in accordance with one embodiment.
Figure 12:
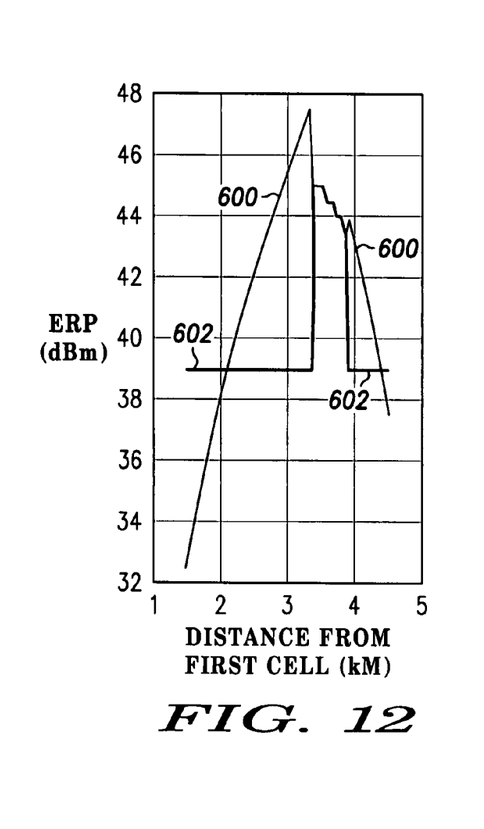
FIG. 12 is a diagram illustrating the effective radiated power verses the distance from a cell in accordance with another embodiment.
Figure 13:
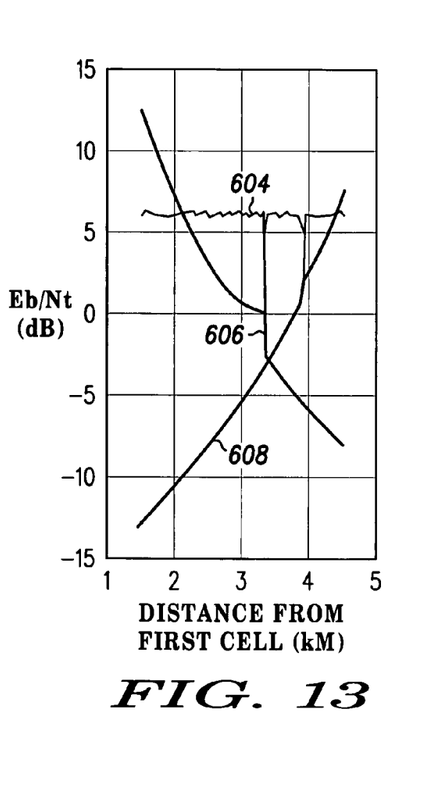
FIG. 13 is a diagram illustrating received signal strengths of a mobile electronic device during a soft handoff in accordance with another embodiment.
Figure 14:
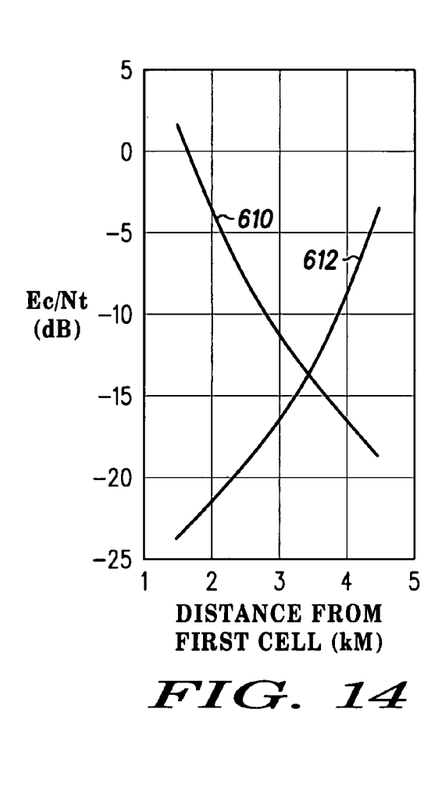
FIG. 14 is a diagram illustrating carrier energy verses total noise density in accordance with another embodiment.

Referring now to FIGS. 9–11 diagrams are shown illustrating power levels during a soft handoff in accordance with yet another embodiment. Shown is an effective radiated power (ERP) for a first cell 500, an ERP for a second cell 502, a bit energy over total noise density (Eb/Nt) for the first cell 504, a Eb/Nt for the second cell 506, a combined Eb/Nt 508, a carrier energy over total noise density (Ec/Nt) for the first cell 510, and a Ec/Nt for the second cell 512. FIGS. 12–14 shows a similar situation to FIGS. 9–11 with the addition of a 5db propagation loss imbalance between the two cells. Shown in FIGS. 12–14 is an effective radiated power (ERP) for a first cell 600, an ERP for a second cell 602, a bit energy over total noise density (Eb/Nt) for the first cell 604, a Eb/Nt for the second cell 606, a combined Eb/Nt 608, a carrier energy over total noise density (Ec/Nt) for the first cell 610, and a Ec/Nt for the second cell 612.

FIGS. 9–11 and 12–14 are examples illustrating the problem associated with resetting the power to a nominal value, such as described above with reference to FIG. 8. While the powers are now equal during the handoff, a notch in the Eb/Nt is created at the handoff borders. This problem is further accentuated when the propagation loss is imbalanced (such as is shown in FIGS. 12–14). Thus, a solution to the problems shown in FIGS. 2–14 is needed.

Figure 15:
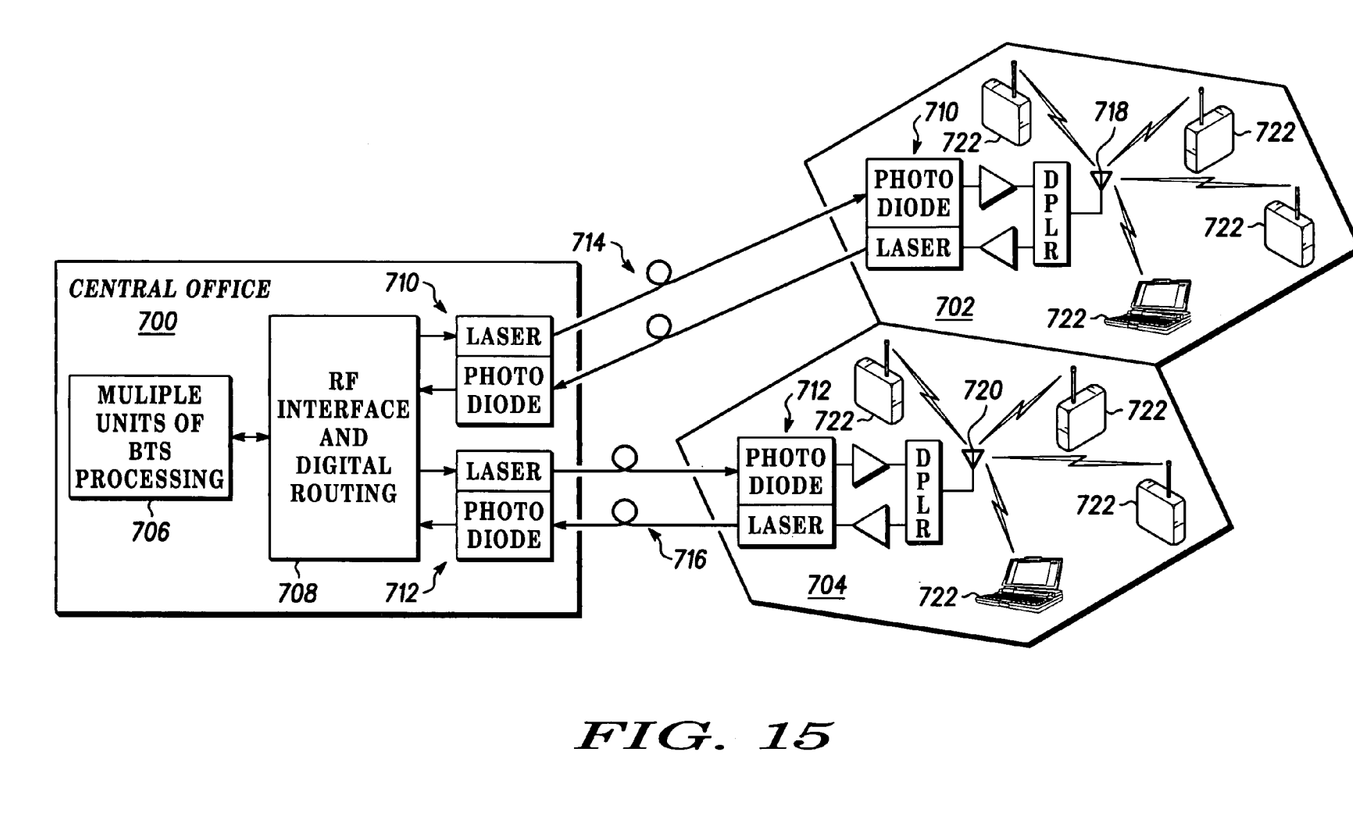
FIG. 15 is a block diagram illustrating a communication system including a central processing station in accordance with one embodiment.

Referring to FIG. 15, shown is a communication system including a central processing station in accordance with one embodiment. Shown is a central command station 700, a first cell 702, a second cell 704, Base Transceiver Station (BTS) processing units 706, an RF interface and digital routing module 708, a first set of a laser and photo diodes 710, a second set of a laser and photo diodes 712, a first communication link 714, a second communication link 716, a first antenna 718, a second antenna 720, and a plurality of communication devices 722. These individual network elements are each generally well understood in the art.

The central command station 700 is connected to the first antenna 718 through the first communication link 714. The central command station 700 is also connected to the second antenna 720 through the second communication link 716. In one embodiment, the first communication link 714 and the second communication link 716 are fiber optic wires, however, other means for transferring data can be used, for example, wireless links. The example shown demonstrates but one embodiment of a central command station and other configurations can be used.

When one of the plurality of communication devices 722 nears the border between the first cell 702 and the second cell 704, the communication device will be able to receive signals from both the first cell 702 and the second cell 704. A soft handoff can occur in this situation, particularly when the communication device is moving further away from the first cell 702 and closer to the second cell 704. At this time, the communication device may send a request for an increase in power. The request is received at the first antenna 718 and the second antenna 720. The request is then sent to the central command station 700. Alternatively, commands or signals are generated from processors (not shown) located at the first antenna 714 and the second antenna 716 and sent to the central command center. The commands correspond to the request from the phone for more power. The central command station receives the commands or the original request from the RTS communication device. Whether the command center receives the original request from the communication device or receives a corresponding signal, this will be referred to herein as the central command center 700 receiving a request for a change in power. The central command center 700 processes the request and sends a signal to change the power output of at least one of the first cell 714 and the second cell 716.

In operation, when one of the communication devices sends a power command to the base stations, such as, "Increase your power by 1 dB," the communication device actually is sending the command "I need 1 dB more power" and the communication device does not care how the base stations manage to do this. Nevertheless, in systems without a central command station, since both base stations receive the same command, they will both increase the power by 1 dB, resulting in a 2 dB increase at the communication device. In a system with a central command station 700, the central command station 700 can, for example, boost the power at the second cell 716 more than the power in the first cell 714, to help the mobile to overcome the temporary shadowing of the building (shown in FIG. 1), while reducing the interference from the first cell. This helps to maintain communication with the second cell, and helps to complete the soft handoff successfully. This cannot be readily implemented in systems without a central command station, since the base stations do not communicate with each other and are independently controlling their power in the fast forward power control loop.

Central Processing/Remote RF is also described in U.S. Pat. No. 5,936,754, U.S. Pat. No. 6,016,426, and U.S. Pat. No. 6,324,391, all of which are incorporated herein by reference in their entirety. Central processing is further described in "Central Processing/Remote RF for Cellular Networks, using Optical Microcells: Concept and Performance" by Kahana et al., SDR 2002 Proceedings, which is incorporate herein in its entirety. These references describe other central processing configurations that can be used in accordance with the embodiments described herein. The base station's functionality can be transferred to the central office by the use of a multi-cell base station which is connected to the cell site RF units via fiber optics. This configuration provides a fast connection via fast buses between elements of the base station and between the base station and the Radio Network Controller (RNC). Optionally, the base station and the RNC can be implemented on a common platform.

Using the central processing architecture, the base stations' power can be adjusted to meet the needs of the mobile according to the fast forward power control loop, while taking into consideration RF conditions and avoiding power drift by maintaining power balance between the cells.

A variety of algorithms may be implemented to avoid power drifting and improve handoff performance. The optimization of these algorithms may require extensive simulation and research and will depend upon environmental conditions. One algorithm that can equalize the powers of base stations involved in a soft handoff will be described. For example, the initial powers of the n base stations in soft handoff transmitted toward a specific mobile are $x_1 \ldots x_n$, and therefore the total transmitted power t is:

$$t = x_1 + x_2 + \ldots + x_n.$$

When the mobile commands a change of power ratio of r, the total transmitted power is:

$$rt = r(x_1 + x_2 + \ldots + x_n).$$

The powers of the base stations are then adjusted to:

$$y_1 = y_2 = \ldots = y_n = rt/n.$$

This way equal power can be maintained from the base stations, thus avoiding power drifting.

To show the effect of this solution, a Matlab simulation was built, which simulates the scenario shown in FIG. 1. It consists of two base stations and a mobile moving from the first cell to the second cell. The simulation characterizes the base stations and the mobile, defines the path loss, the noise and interference, and calculates the Eb/Nt and Ec/Nt from at the mobile from the base stations. It also used $T_{add}$ and $T_{drop}$ to define the ranges at which the mobile enters and exits handoff. At each point between the base stations, the base stations power is controlled to maintain a constant Eb/Nt. Before the handoff, only the power of the first cell is controlled, during the handoff the power of both cells is controlled, and after the handoff only the power of the second cell is controlled.

Throughout the mobile movement a graph of the power of the two cells (ERPpc1 and ERPpc2), the traffic channel signal to noise+interference at the mobile before, during, and after the handoff (EbNt1, EbNt combined, and EbNt2), and the pilot channel signal to noise+interference from each cell (EcNt1 and EcNt2) is shown.

Figure 16:
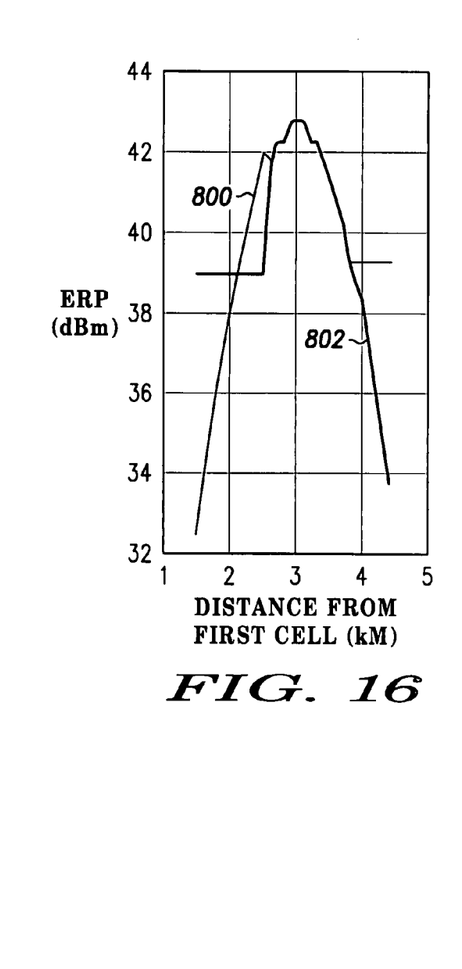
FIG. 16 is a diagram illustrating the effective radiated power verses the distance from a cell utilizing the system of FIG. 15 in accordance with one embodiment.
Figure 17:
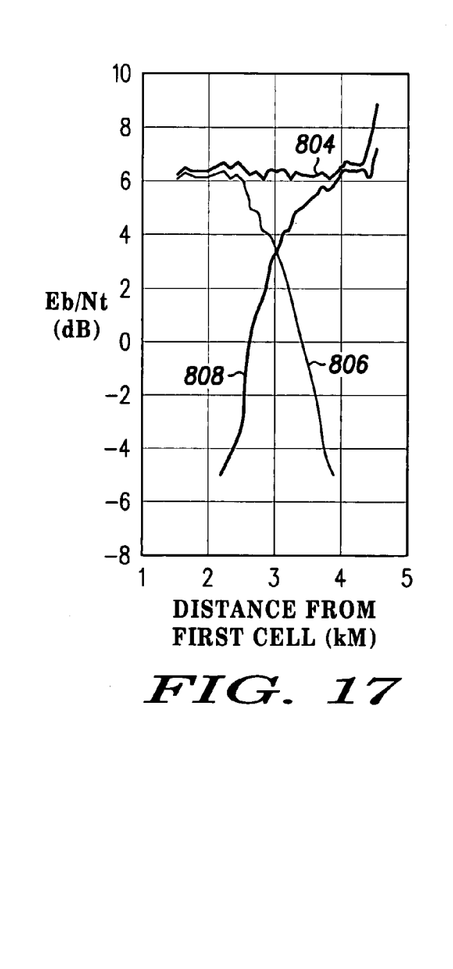
FIG. 17 is a diagram illustrating received signal strengths of a mobile electronic device during a soft handoff utilizing the system of FIG. 15 in accordance with one embodiment.
Figure 18:
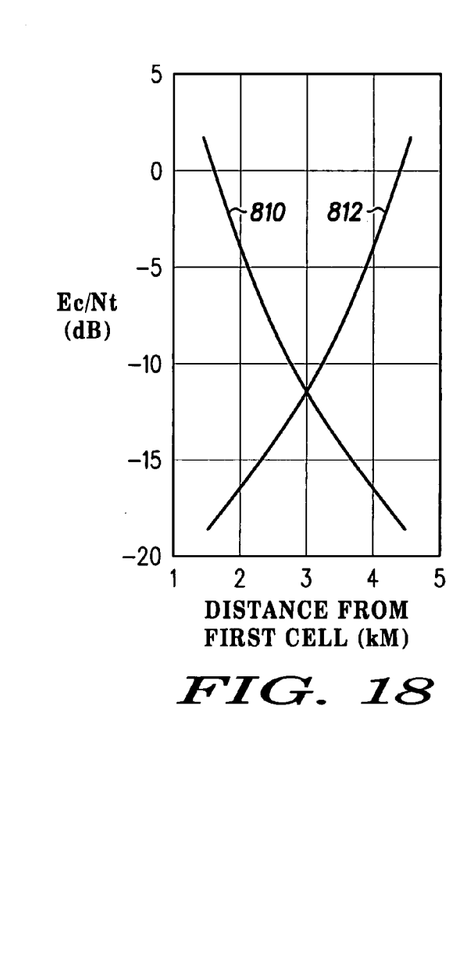
FIG. 18 is a diagram illustrating carrier energy verses total noise density utilizing the system of FIG. 15 in accordance with one embodiment.
Figure 19:
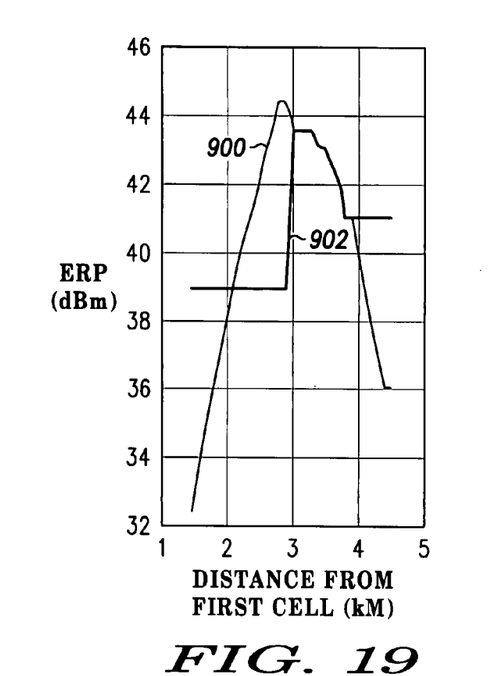
FIG. 19 is a diagram illustrating the effective radiated power verses the distance from a cell utilizing the system of FIG. 15 in accordance with one embodiment.
Figure 20:
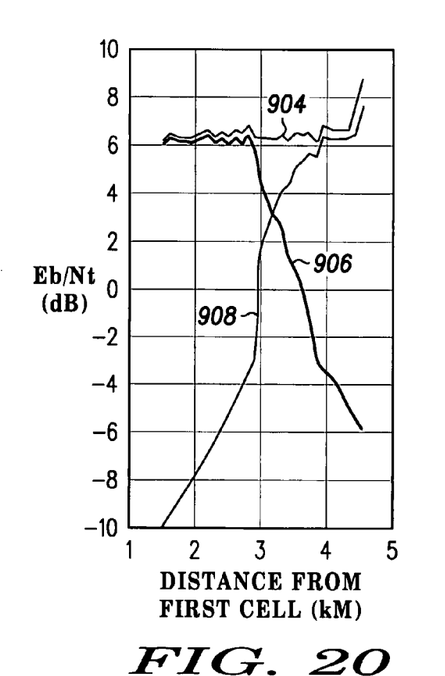
FIG. 20 is a diagram illustrating received signal strengths of a mobile electronic device during a soft handoff utilizing the system of FIG. 15 in accordance with one embodiment.
Figure 21:
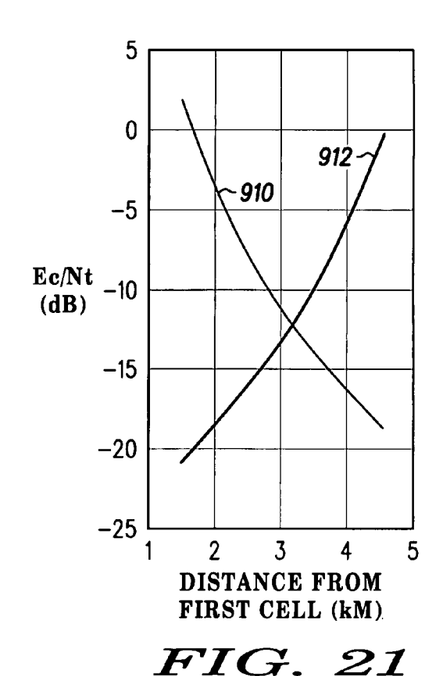
FIG. 21 is a diagram illustrating carrier energy verses total noise density utilizing the system of FIG. 15 in accordance with one embodiment.

FIGS. 16–18 are diagrams illustrating power levels of the system of FIG. 15 in accordance with one embodiment. Shown is an effective radiated power (ERP) for a first cell 800, an ERP for a second cell 802, a bit energy over total noise density (Eb/Nt) for the first cell 804, a Eb/Nt for the second cell 806, a combined Eb/Nt 808, a carrier energy over total noise density (Ec/Nt) for the first cell 810, and a Ec/Nt for the second cell 812. FIGS. 19–21 are diagrams illustrating power levels of the system of FIG. 15 in accordance with another embodiment. Shown in FIGS. 19–21 is an effective radiated power (ERP) for a first cell 900, an ERP for a second cell 902, a bit energy over total noise density (Eb/Nt) for the first cell 904, a Eb/Nt for the second cell 906, a combined Eb/Nt 908, a carrier energy over total noise density (Ec/Nt) for the first cell 910, and a Ec/Nt for the second cell 912. FIGS. 16–18 and FIG. 19–21 all demonstrate the advantage of having a central processing station for controlling the power of the base stations.

FIGS. 16–18 and 19–21 show the results with the application of the algorithm described earlier with reference to FIG. 15. While the powers are equal during handoff, there is no notch in the Eb/Nt. Additionally, this behavior is not affected by propagation loss imbalance as is shown in FIGS. 19–21. The algorithm described earlier is but one example of an algorithm that can be used in accordance with the system of FIG. 15 and different algorithms can be optimized for different situations.

Central processing has many advantages in implementing a better fast forward power control in 3G cellular networks. As described the current implementations either cause power drift, or cause signal notches at handoff transitions, whereas the embodiments described herein can keep the powers during handoff equal while avoiding signal notches. This solution can be made possible in a central office architecture, where information about the power at the cells is known.

Figure 22:
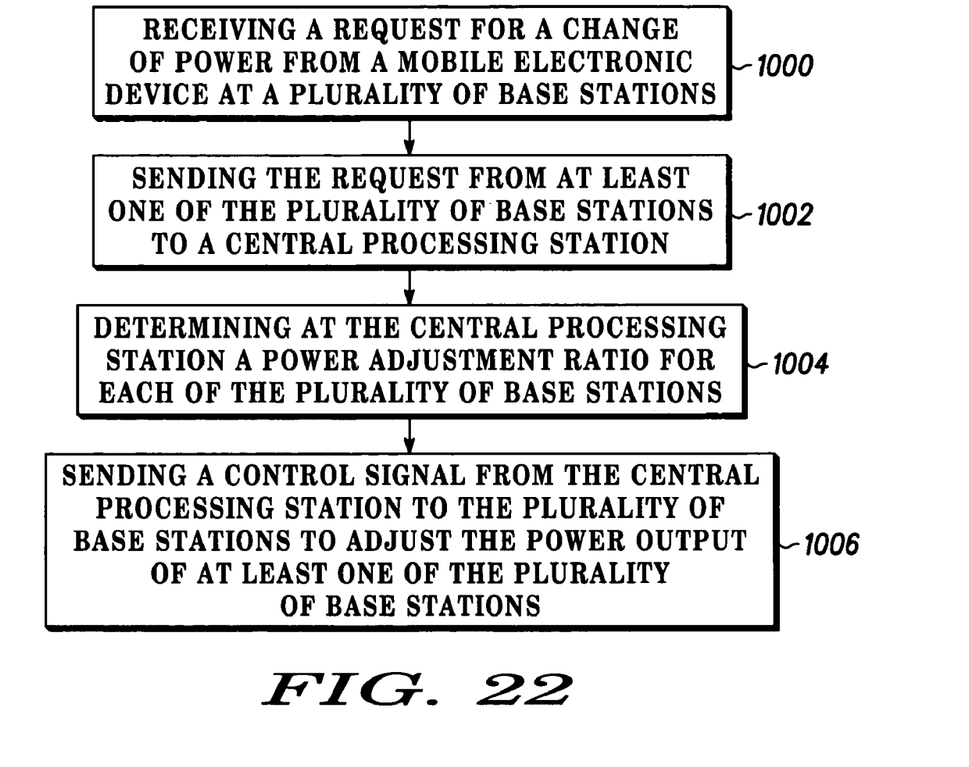
FIG. 22 is a flow diagram illustrating a method of power control for a communication device in accordance with one embodiment.

Referring now to FIG. 22 a flow diagram is shown illustrating a method of power control for a communication device in accordance with one embodiment.

First, a request for a change in power from a mobile electronic device is received at a plurality of base stations 1000. In one example, the request is for an increase in power. Next, the request is sent from at least one of the base station to a central processing station 1002. Following, the central processing station determines a power adjustment ratio for each of the plurality of base stations 1004. Finally, a control signal is sent from the central processing station to the plurality of base stations to adjust the power output of at least one of the plurality of base stations 1006. Advantageously, each of the plurality of base stations can adjust their power output at different levels as commanded by the central processing station. In a preferred embodiment, the above method can be performed during a soft handoff of the mobile electronic device.

While the invention herein disclosed has been described by means of specific embodiments and applications thereof, other modifications, variations, and arrangements of the present invention may be made in accordance with the above teachings other than as specifically described to practice the invention within the spirit and scope defined by the following claims.

I claim:

1. A method of performing a soft handoff comprising the steps of:
    receiving a request for a change in power from a communications device at a plurality of base stations;
    sending the request from at least one of the base stations to a central processing station;
    determining at the central processing station a power adjustment ratio for each of the plurality of base stations;
    sending at least one control signal from the central processing station to each of the plurality of base stations to adjust the power output of at least one of the plurality of base stations; and
    utilizing an algorithm to determine the power adjustment ratio at the plurality of base stations wherein the algorithm is at least partially defined by:
    $p1a=p2a=(p1b+p2b)/2$;
    wherein $p1b$ and $p2b$ are power levels before a handoff transition;
    wherein $p1a$ and $p2a$ are power levels after a handoff transition.

2. The method of claim 1 wherein the step of sending at least one control signal from the central processing station to each of the plurality of base stations is performed during a soft handoff.

3. The method of claim 1 wherein the communications device is a cellular telephone.

4. The method of claim 1 wherein the communications device is a personal digital assistant.

5. The method of claim 1 wherein the communications device is a laptop computer.

6. The method of claim 1 wherein the central processing station is configured to send a power control signal.

7. A communication system for controlling power during a soft handoff comprising:
    a plurality of base stations configured to send and receive signals to a plurality of communication devices; and
    a central command station configured to send and receive signals to the plurality of base stations, the central command station further configured to communicate power control commands to the plurality of base stations;
    wherein the power control commands control output power of at least two of the plurality of base stations in response to one of the communication devices sending a power adjust request;
    wherein the central command station utilizes an algorithm to determine an adjustment of power at the at least two base stations; and
    wherein the algorithm is defined at least in part by:
    $p1a=p2a(p1b+p2b)/2$;
    wherein $p1b$ and $p2b$ are power levels before a handoff transition;
    wherein $p1a$ and $p2a$ are power levels after a handoff transition.

8. The communication system of claim 7 wherein the power control commands are sent to at least two of the base stations during a soft handoff.

9. The communication system of claim 8 wherein the communications device is a cellular telephone.

10. The communication system of claim 9 wherein the communications device is a personal digital assistant.

11. The method of claim 9 wherein the communications device is a laptop computer.

12. The communication system of claim 9 wherein the communication system is a CDMA system.

13. A central command station comprising:
    a first communication channel for sending and receiving data from a first base station;
    a second communication channel for sending and receiving data from a second base station;
    one or more processing units for determining power control signals for controlling the output power of the first base station and the second base station, wherein the power control signal is determined in response to a request from a communication device, the request being received by both the first base station and the second base station; and
    a processor configured to determine a power control ratio for each of the first base station and the second base station
    wherein the power control ratio is determined using an algorithm defined by:
    $p1a=p2a=(p1b+p2b)/2$;
    wherein $p1b$ and $p2b$ are power levels before a handoff transition;
    wherein $p1a$ and $p2a$ are power levels after a handoff transition.

14. A system for performing a soft handoff comprising:
    means for receiving a request for a change in power from a communication device at a plurality of base stations;
    means for sending the request from at least one of the base stations to a central processing station;
    means for determining at the central processing station a power adjustment ratio for each of the plurality of base stations;
    means for sending one or more control signals from the central processing station to each of the plurality of base stations to adjust the power output of at least one of the plurality of base stations; and
    means for utilizing an algorithm to determine the adjustment of power output at the plurality of base stations wherein the algorithm is defined by:
    $p1a=p2a=(p1b+p2b)/2$;
    wherein $p1b$ and $p2b$ are power levels before a handoff transition;
    wherein $p1a$ and $p2a$ are power levels after a handoff transition.

* * * * *